US006246457B1

United States Patent
Kobayashi

(10) Patent No.: US 6,246,457 B1
(45) Date of Patent: Jun. 12, 2001

(54) LIQUID CRYSTAL DISPLAY DEVICE IN WHICH COPPER LAYER FILLING BETWEEN L-SHAPE COLOR FILTERS AND METHOD FOR MAKING THE SAME

(75) Inventor: Masakazu Kobayashi, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/019,140

(22) Filed: Feb. 5, 1998

(30) Foreign Application Priority Data

Feb. 7, 1997 (JP) .................................................. 9-025602

(51) Int. Cl.[7] ...................... G02F 1/1335; G02F 1/1333; G03F 9/00
(52) U.S. Cl. .......................... 349/106; 349/110; 349/111; 430/7
(58) Field of Search ................................... 349/106, 110, 349/111; 430/7

(56) References Cited

U.S. PATENT DOCUMENTS

| | | | | |
|---|---|---|---|---|
| 4,935,757 | * | 6/1990 | Hatano et al. ........................ | 350/336 |
| 5,250,932 | * | 10/1993 | Yashimoto et al. ................... | 345/206 |
| 5,305,154 | * | 4/1994 | Sumi et al. ........................... | 359/885 |
| 5,500,491 | * | 3/1996 | Watanabe ............................... | 178/18 |
| 5,508,134 | * | 4/1996 | Shirai .................................... | 430/20 |
| 5,638,198 | * | 6/1997 | Crossley et al. ...................... | 349/104 |
| 5,705,302 | * | 1/1998 | Ohno et al. ............................. | 430/7 |
| 5,790,219 | * | 8/1998 | Yamagishi et al. ................... | 349/106 |
| 5,995,188 | * | 11/1999 | Shimizu et al. ....................... | 349/147 |
| 6,016,179 | * | 1/2000 | Fukumoto et al. ................... | 349/128 |
| 6,038,006 | * | 3/2000 | Sasaki et al. .......................... | 349/106 |
| 6,057,900 | * | 5/2000 | Ono et al. .............................. | 349/110 |
| 6,067,134 | * | 5/2000 | Akiyama et al. ....................... | 349/74 |
| 6,068,953 | * | 5/2000 | Matsumoto et al. ..................... | 430/7 |
| 6,128,050 | * | 10/2000 | Sekiguchi ............................... | 349/40 |

* cited by examiner

Primary Examiner—William L. Sikes
Assistant Examiner—Mike Qi
(74) Attorney, Agent, or Firm—Brinks Hofer Gilson & Lione

(57) ABSTRACT

A liquid crystal display device includes a black mask formed by depositing two substances, the interface between the two substances having a black color. In a method for making a liquid crystal display device having a color filter substrate, composed of a transparent substrate, color filters, and transparent electrodes, a process for fabricating the color filter substrate comprises: a step for forming a plurality of striped zinc oxide layers; a step for forming color filters each having a color; a step for forming a copper layer; a step for forming an overcoat layer; and a step for forming a plurality of transparent electrodes.

10 Claims, 6 Drawing Sheets

FIG. 1A
FIG. 1B
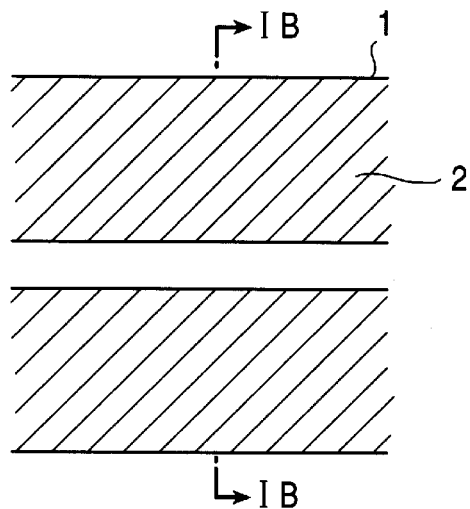
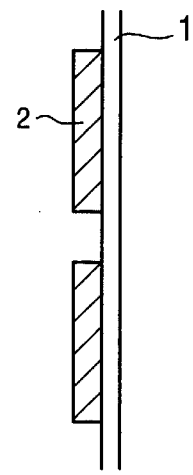
FIG. 2A
FIG. 2B
FIG. 2C
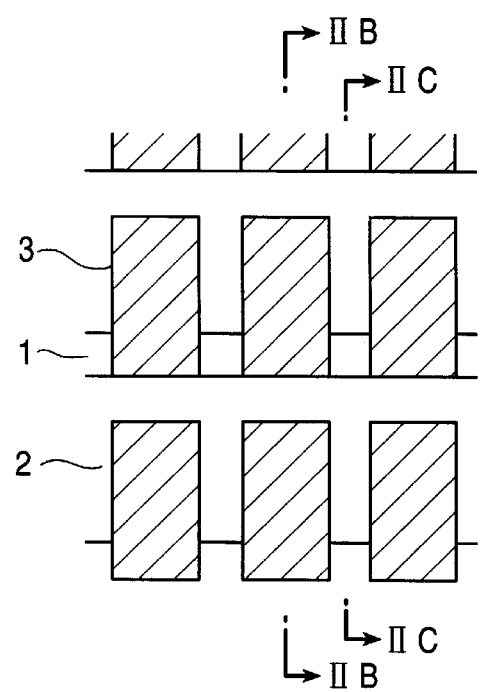
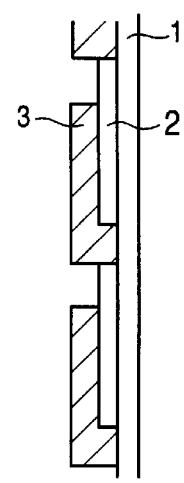
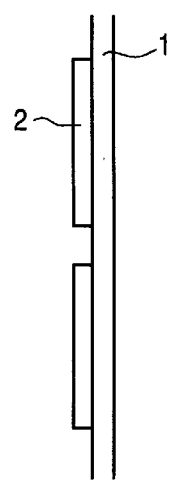

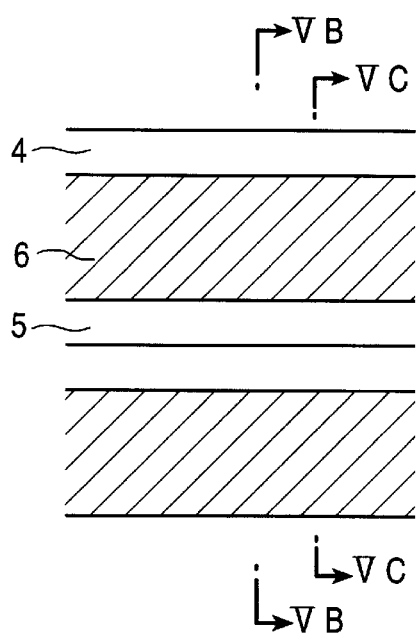 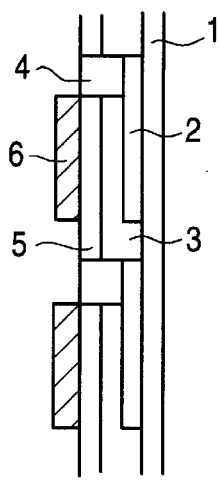 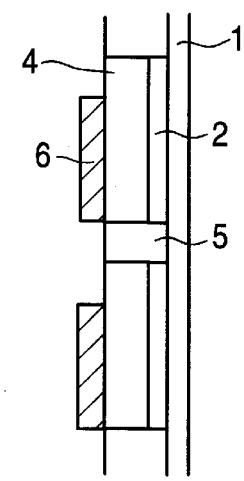
FIG. 5A  FIG. 5B  FIG. 5C
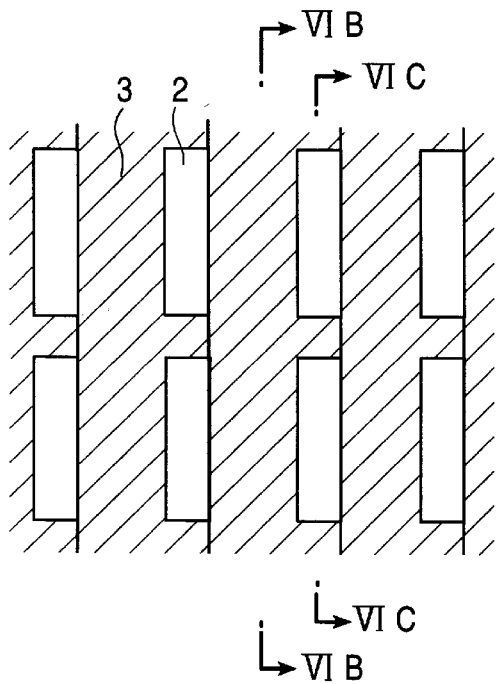 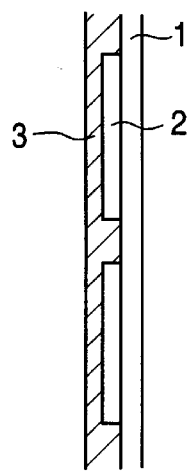 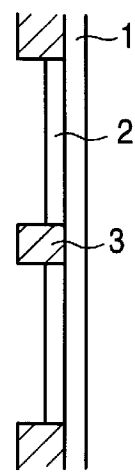
FIG. 6A  FIG. 6B  FIG. 6C

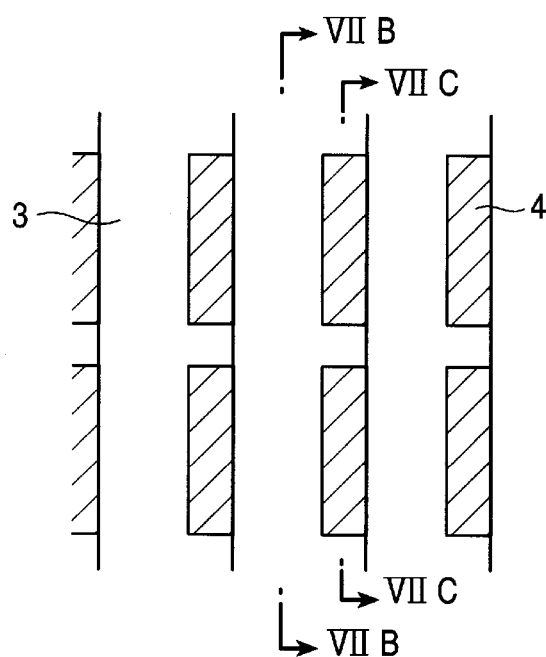
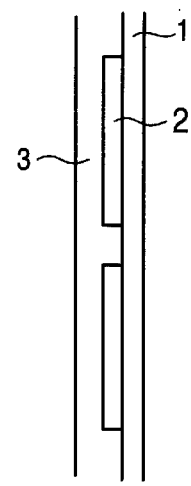
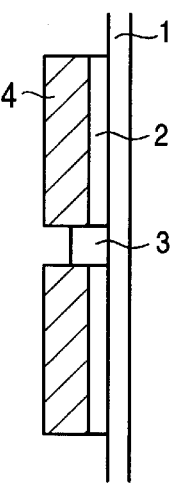
FIG. 7A  FIG. 7B  FIG. 7C
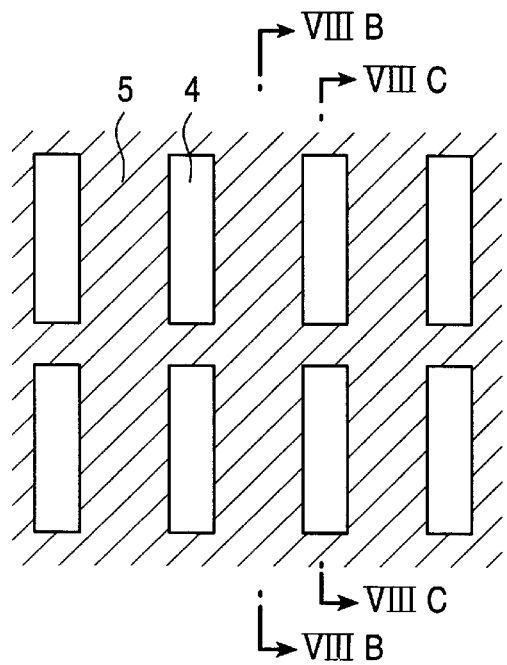
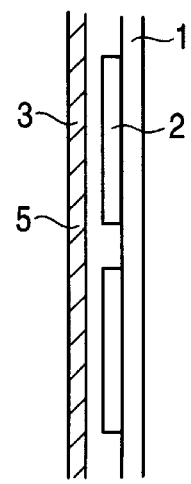
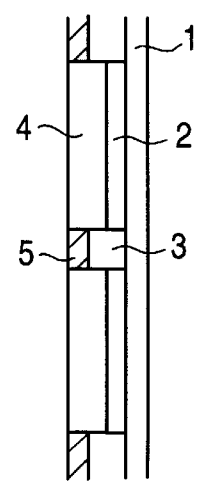
FIG. 8A  FIG. 8B  FIG. 8C

LIQUID CRYSTAL DISPLAY DEVICE IN WHICH COPPER LAYER FILLING BETWEEN L-SHAPE COLOR FILTERS AND METHOD FOR MAKING THE SAME

BACKGROUND OF THE INVENTION

1. Field of the Invention

The present invention relates to a liquid crystal display device for full color displaying, and a method for making the same, and in particular, a method for fabricating a color filter applied to the liquid crystal display device.

2. Description of the Related Art

As is known, in a liquid crystal display device, a liquid crystal layer is sandwiched between each one pair of alignment films, transparent electrodes, color filters, transparent substrates, and polarizing filters deposited in that order from the liquid crystal layer.

Since the transparent electrode and the color filters are generally deposited on the transparent substrate, the transparent substrate provided with the transparent electrode and the color filters is hereinafter referred to as a "color filter substrate".

A method for fabricating the color filter substrate in a conventional liquid crystal display device will be described as follows.

FIGS. 10A, 10B, 10C, 10D, and 10E are schematic representations of a fabricating process for the color filter substrate.

In this process, as shown in FIG. 10A, a plurality of parallel transparent electrodes 6 are formed, at a given distance, on a surface of a transparent substrate 1. The transparent electrodes 6 are composed of ITO.

Next, as shown in FIG. 10B, a plurality of horizontal stripes 100 are formed so as to cross the transparent electrodes 6. The horizontal stripes 100 are formed by the steps of (a) applying a photo resist onto an entire surface of each of the transparent electrodes 6 and drying the photo resist, (b) exposing the photo resist layer with a mask which has slits shaped exactly like the horizontal stripes 100, and (c) removing the unexposed photo resist.

After the horizontal stripes 100 are formed, as shown in FIG. 10C, any one of the color filters 3, R, G or B, is deposited on portions of the corresponding transparent electrodes which are not covered by the horizontal stripes 100, by an electro-deposition process, a dyeing process, a printing process, or the like. Then, the color filters 3 are baked and solidified at a temperature of approximately 250° C.

After the color filters 3 are formed, the horizontal stripes 100 are removed by showering an alkali solution containing, for example, sodium hydroxide while brushing them. Thus, as shown in FIG. 10D, a color filter substrate is obtained, which is not yet provided with a shading film (hereinafter called a "black mask").

Finally, a black resist is applied onto an entire surface of the color filers 3 followed by drying. Then, by exposing from the back face of the transparent substrate 1, the unexposed black resist is removed. As shown in FIG. 10E, a black mask 101 is formed on the spaces between the color filters 3.

In accordance with the process described above, a transparent substrate provided with transparent electrodes and color filters, namely a color filter substrate, is fabricated. After this, a liquid crystal display device will be completed by enclosing a liquid crystal layer between each one pair of alignment films, the color filter substrates, and polarizing filters.

In the above-mentioned conventional liquid crystal display device, since ITO forming the transparent electrodes has a low conductivity, it is difficult to have a large potential difference between one pair of electrodes opposing each other with the liquid crystal layer therebetween, and therefore the display quality is low.

Also, in the above-mentioned conventional liquid crystal display device, the shading property of the black mask depends on a quantity of carbon black in the black resist forming the black mask. Accordingly, in order to increase the shading property of the black mask, a large quantity of carbon black may be included; however, because carbon black has a relatively high conductivity, if a large quantity of carbon black is added, the black mask becomes conductive, causing a short circuit between the transparent electrodes adjoining the black mask. Thus, a large quantity of carbon black cannot be added. Accordingly, the conventional liquid crystal display device has a black mask with a low shading property and has a low quality of display.

SUMMARY OF THE INVENTION

It is an object of this invention to provide a liquid crystal display device having highly conductive transparent electrodes and a shading film (black mask) with an excellent shading property.

It is another object of this invention to provide a method for making a liquid crystal display device.

BRIEF DESCRIPTION OF THE DRAWINGS

FIG. 1A is a plan view of striped zinc oxide layers 2 in accordance with an embodiment of the present invention, and FIG. 1B is a sectional view taken along the line IB—IB of FIG. 1A;

FIG. 2A is a plan view of color filters 3 in accordance with an embodiment of the present invention, FIG. 2B is a sectional view taken along the line IIB—IIB of FIG. 2A, and FIG. 2C is a sectional view taken along the line IIC—IIC of FIG. 2A;

FIG. 5A is a plan view of transparent electrodes 6 in accordance with an embodiment of the present invention, FIG. 5B is a sectional view taken along the line VB—VB of FIG. 5A, and FIG. 5C is a sectional view taken along the line VC—VC of FIG. 5A;

FIG. 6A is a plan view of color filters 3 in accordance with a second embodiment, FIG. 6B is a sectional view taken along the line VIB—VIB of FIG. 6A, and FIG. 6C is a sectional view taken along the line VIC—VIC of FIG. 6A;

FIG. 7A is a plan view of copper layers 4 in accordance with the second embodiment, FIG. 7B is a sectional view taken along the line VIIB—VIIB of FIG. 7A, and FIG. 7C is a sectional view taken along the line VIIC—VIIC of FIG. 7A;

FIG. 8A is a plan view of an overcoat layer 5 in accordance with the second embodiment, FIG. 8B is a sectional view taken along the line VIIIB—VIIIB of FIG. 8A, and FIG. 8C is a sectional view taken along the line VIIIC—VIIIC of FIG. 8A;

DESCRIPTION OF THE PREFERRED EMBODIMENTS

Figure 3A:
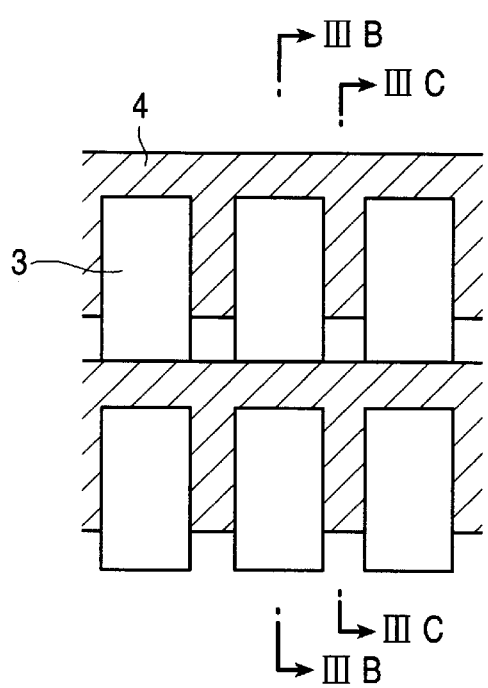
FIG. 3A is a plan view of copper layers 4 in accordance with an embodiment of the present invention.

In the present invention, a black mask provided between color filters comprises an interface formed by depositing two types of substances. The interface has a black color.

In accordance with this invention, a black color having a high shading property is obtained regardless of quantities of the two types of substances deposited since the present invention takes advantage of the characteristic that an interface between the two layers becomes black.

An embodiment of the present invention will now be described with reference to the drawings.

A liquid crystal display device in accordance with this invention has a color filter substrate (namely, a transparent substrate provided with transparent electrodes and color filters) with a different structure, as well as a method for making the color filter substrate that is different from the conventional liquid crystal display device. A method for making the color filter substrate in accordance with the present invention includes the following steps from (1) to (5).

(1) Formation of Striped Zinc Oxide Layers

As shown in FIG. 1, in accordance with the present invention, a plurality of striped zinc oxide (ZnO) layers 2 are formed at a given distance on a surface of a transparent substrate 1 such as a glass substrate. FIG. 1B is a sectional view taken along the line IB—IB of FIG. 1A. The striped zinc oxide layers 2 are formed by depositing a zinc oxide layer on the entire surface of the transparent substrate 1 and then by removing parts of the zinc oxide. A space provided between the striped zinc oxide layers 2 by the removal treatment is hereinafter called a "separating strip". In an embodiment of the present invention, a width of the separating strip (the space between striped zinc oxide layers 2) is, for example, 5 $\mu$m to 10 $\mu$m. The separating strip is provided in order to prevent a short circuit between the electrodes to be formed later.

(2) Formation of Color Filters

As shown in FIG. 2, a plurality of color filters 3 are formed, at a given distance, on the striped zinc oxide layers 2 and the transparent substrate 1 to form a color filter matrix. FIG. 2B is a sectional view taken along the line IIB—IIB of FIG. 2A, and FIG. 2C is a sectional view taken along the line IIC—IIC of FIG. 2A. The color filters 3 are formed by an electro-deposition process, a dyeing process, a printing process or the like, wherein any one of the color filters, R, G or B, is deposited on the striped zinc oxide layers 2 and the transparent substrate 1, and then is baked and solidified at a temperature of approximately 250° C. The striped zinc oxide layers 2 are not entirely covered with the color filters 3, but as shown in FIG. 2, the striped zinc oxide layers 2 are partly exposed between the color filters 3. Also, in an embodiment of the present invention, the color filters 3 that are vertically aligned, as shown in FIG. 2, have the same color. And the color filters 3 are arranged R, G, B, R, G, B . . . in the transverse direction.

(3) Formation of Copper Layer

Figure 3B:
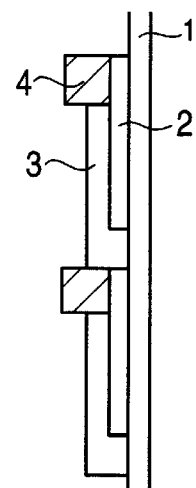
FIG. 3B is a sectional view taken along the line IIIB—IIIB of FIG. 3A.
Figure 3C:
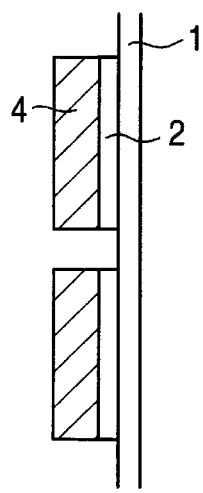
FIG. 3C is a sectional view taken along the line IIIC—IIIC of FIG. 3A.

As shown in FIG. 3, copper (Cu) layers 4 are formed on the striped zinc oxide layers 2 which are exposed between the color filters 3. FIG. 3B is a sectional view taken along the line IIIB—IIIB of FIG. 3A, and FIG. 3C is a sectional view taken along the line IIIC—IIIC of FIG. 3A. A plating process is used to form the copper layers 4. Thus, the copper layers 4 are formed exactly on the striped zinc oxide layers 2. That is, copper layers 4 can be spaced at a distance of 5 $\mu$m to 10 $\mu$m, in an embodiment of the present invention, which is the same as the width (the spaces between striped zinc oxide layers 2) of the separating strip. By placing the striped zinc oxide layers 2 in contact with the copper layer 4 the interface between them becomes black. In an embodiment of the present invention, the black interface corresponds to a black mask between the color filters 3.

(4) Formation of Overcoat Layer

Figure 4A:
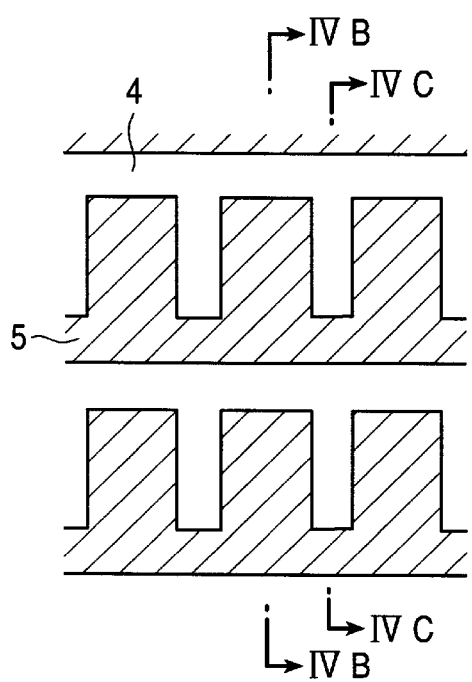
FIG. 4A is a plan view of overcoat layers 5 in accordance with an embodiment of the present invention.
Figure 4B:
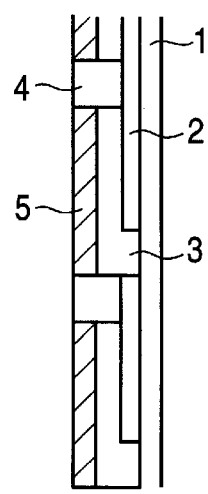
FIG. 4B is a sectional view taken along the line IVB—IVB of FIG. 4A.
Figure 4C:
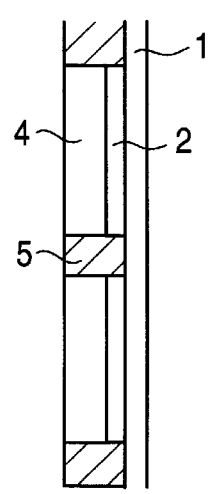
FIG. 4C is a sectional view taken along the line IVC—IVC of FIG. 4A.
Figure 9A:
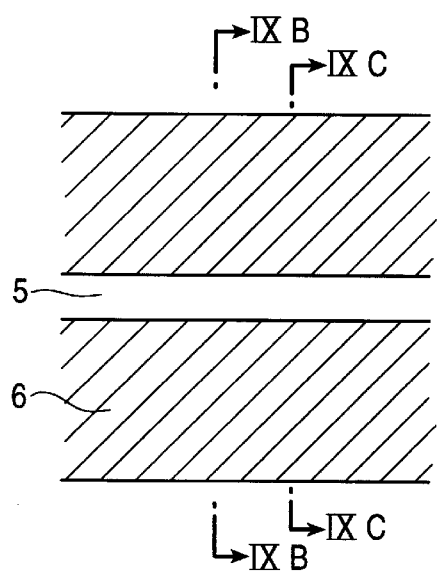
FIG. 9A is a plan view of transparent electrodes 6 in accordance with the second embodiment.
Figure 9B:
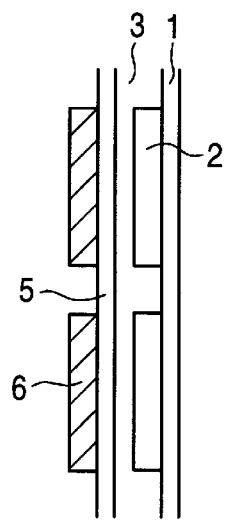
FIG. 9B is a sectional view taken along the line IXB—IXB of FIG. 9A.
Figure 9C:
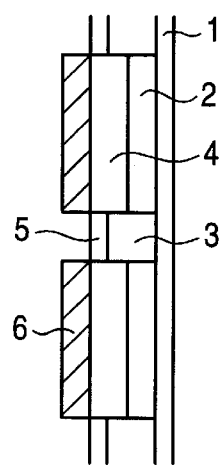
FIG. 9C is a sectional view taken along the line IXC—IXC of FIG. 9A.
Figure 10A:
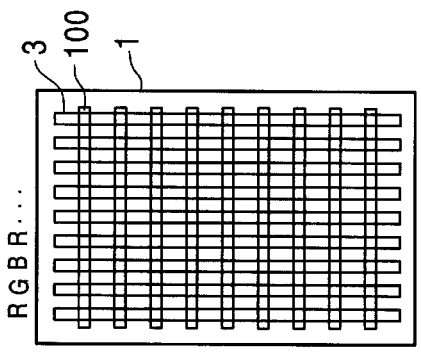
FIGS. 10A, 10B, 10C, 10D, and 10E are the schematic representations of a fabricating process for a color filter substrate in accordance with a conventional liquid crystal display device.
Figure 10B:
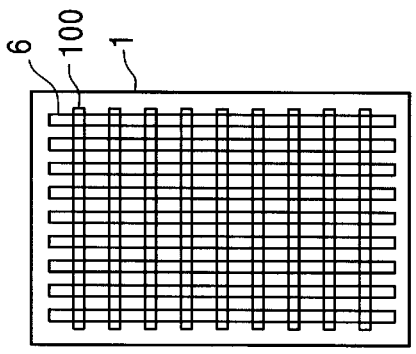
Figure 10C:
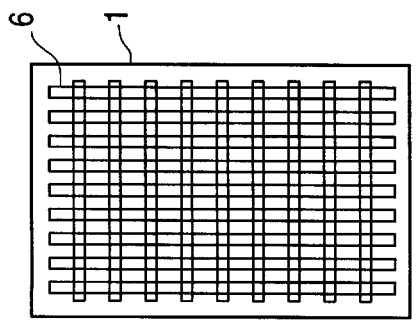
Figure 10D:
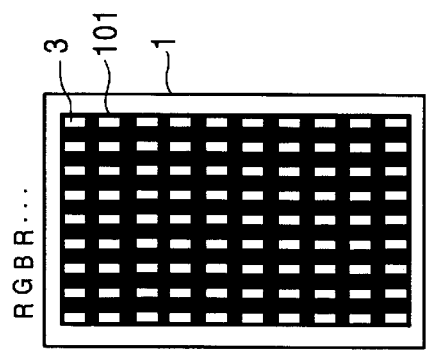
Figure 10E:
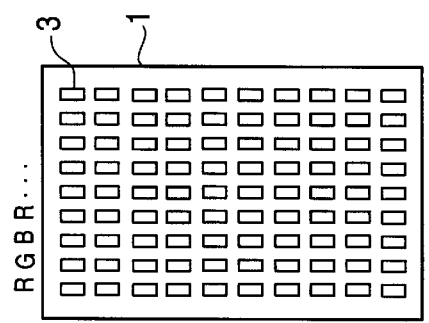

As shown in FIG. 4, overcoat layers 5 are formed on the color filters 3. FIG. 4B is a sectional view taken along the line IVB—IVB of FIG. 4A, and FIG. 4C is a sectional view taken along the line IVC—IVC of FIG. 4A. The overcoat layers 5 can compensate for the differences in heights between the color filters 3. The most suitable thickness of the respective color filters 3 for achieving optimum coloring varies depending on the color (R, G, B). Also, the overcoat layers 5 can fill the spots wherein the transparent substrate 1 is exposed without being deposited with either the color filters 3 or the copper layer 4 among the separating strips provided between each striped zinc oxide layers 2. In this way, as shown in FIG. 4B and FIG. 4C, a surface of the overcoat layer 5 is formed so that it is completely planar. The overcoat layers 5, however, are not formed on the copper layers 4, which remain exposed.

(5) Formation of Transparent Electrode

Finally, as shown in FIG. 5, a plurality of striped transparent electrodes 6 are formed at a given distance. FIG. 5B is a sectional view taken along the line VB—VB of FIG. 5A, and FIG. 5C is a sectional view taken along the line VC—VC of FIG. 5A. The transparent electrodes 6 are formed by providing an ITO layer on the entire surface of the overcoat layer 5, and by patterning it. As shown by comparison of FIG. 4A with FIG. 5A, the transparent electrodes 6 are formed on the copper layers 4 extending horizontally. Thus, wiring resistance of the transparent electrodes 6 decreases because the copper layers 4 having a significantly higher conductivity than that of the transparent electrodes (ITO) 6 are connected with the transparent electrodes. In this case, although a short circuit between the transparent electrodes 6 resulting from a short circuit between the copper layers 4 may occur, no short circuit is observed between the copper layers 4 since, as described above, the copper layers 4 are formed by a plating process exactly on the striped zinc oxide layers 2 having the separating strips.

In accordance with the steps described above, the transparent substrate provided with transparent electrodes and color filters, namely the color filter substrate is fabricated. Then, a liquid crystal display device is completed by sandwiching a known liquid crystal layer between a pair of known alignment films, the color filter substrates, and known polarizing filters. Of course, an orientation of one pair of alignment films, a wiring direction of one pair of transparent electrodes in the color filter substrates, and a deflection direction of one pair of polarizing filters have a given angle, respectively.

The present invention is not limited to the preferred embodiment described above, and various alterations of design can be made within the scope while not deviating from the object of this invention.

For example, in the embodiment described above, the patterns of the striped zinc oxide layers 2, the color filters 3, the copper layers 4, the overcoat layer 5 and the transparent electrodes 6 are shown in FIG. 1 to FIG. 5. However, provided that the characteristics of this invention are satisfied,—that is, the interface between the striped zinc oxide layers 2 and the copper layer 4 is used as a black mask, and additionally the wiring resistance of the transparent electrodes 6 decreases by connecting the copper layers 4 with the transparent electrodes 6—any pattern for the above-mentioned layers can also be employed. Another example, other than the above embodiment of the present invention, is shown in FIG. 6 to FIG. 9, wherein the formation pattern for the striped zinc oxide layers 2 is the same as that in the above embodiment of the present invention (Refer to FIG. 1). That is, in this example, these patterns are formed by the steps shown in FIG. 1, FIG. 6, FIG. 7, FIG. 8 and FIG. 9 in that order.

As described above, in accordance with this invention, the shading property of a black mask and the quality of display can be improved.

Further, in accordance with this invention, the quality of display can be improved by leading transparent electrodes to the substance (copper) which has a higher conductivity than that of the transparent electrodes, resulting in a decrease in wiring resistance of the transparent electrodes.

Further, in accordance with this invention, copper layers can be formed exactly on exposed striped zinc oxide layers by using a plating process. Accordingly, no short circuit will occur between striped zinc oxide layers, between copper layers, and between transparent electrodes.

What is claimed is:

1. A liquid crystal display device, comprising:
a liquid crystal layer;
a pair of alignment films enclosing said liquid crystal layer;
a pair of color filter substrates sandwiching said liquid crystal layer from the outside of said alignment films; and
a pair of polarizing filters sandwiching said liquid crystal layer from the outside of said color filter substrates;
said color filter substrate comprising;
a transparent substrate;
a plurality of striped zinc oxide layers formed on one surface of said transparent substrate;
color filters each having a color, the color filters formed on said striped zinc oxide layers such that parts of said striped zinc oxide layers are continuously exposed along a lateral direction of the striped zinc oxide layers, the color filters also formed to insulate the zinc oxide layers from each other, each color filter having a predetermined cross-sectional shape;
a copper layer having a predetermined height and formed on said striped zinc oxide layers exposed between said color filters, the copper layer filling exposed regions between the color filters;
an overcoat layer formed on the color filters, the copper layer remaining uncovered by the overcoat layer; and
a plurality of transparent electrodes insulated from each other and leading to said copper layer formed in the same direction.

2. A liquid crystal display device according to claim 1, wherein said copper layer is formed on said striped zinc oxide layers by a plating process.

3. A method for making a liquid crystal display device the liquid crystal display device comprising a color filter substrate including a transparent substrate, color filters, and transparent electrodes, the method comprising:
forming a plurality of striped zinc oxide layers on one surface of said transparent substrate;
forming color filters, each having a colors on said striped zinc oxide layers such that parts of said striped zinc oxide layers are continuously exposed along a lateral direction of the striped zinc oxide layers;
insulating the striped zinc oxide layers from each other using the color filters;
forming a copper layer of a predetermined height on said striped zinc oxide layers exposed between said color filters;
filling exposed regions between the color filters with the copper layer;
forming an overcoat layer on the color filters, the copper layer remaining uncovered by the overcoat layer; and
forming a plurality of transparent electrodes insulated from each other and such that said transparent electrodes lead to said copper layer formed in the same direction as said transparent electrodes.

4. A method for making a liquid crystal display device according to claim 3, wherein said copper layer is formed on said striped zinc oxide layers by a plating process.

5. A liquid crystal display device according to claim 1, the predetermined shape of the color filter being an "L".

6. A liquid crystal display device according to claim 1, the predetermined height of the copper layer being larger than a height of a portion of the color filters disposed above the striped zinc oxide layers.

7. A liquid crystal display device according to claim 1, antireflective properties of a series combination of the striped zinc oxide layer and the copper layer forming a black mask.

8. A method for making a liquid crystal display device according to claim 3, further comprising forming each color filter into a cross-sectional "L" shape.

9. A method for making a liquid crystal display device according to claim 3, further comprising selecting the predetermined height of the copper layer to be larger than a height of a portion of the color filters disposed above the striped zinc oxide layers.

10. A method for making a liquid crystal display device according to claim 3, further comprising forming a black mask using antireflective properties of a series combination of the striped zinc oxide layer and the copper layer.

* * * * *

UNITED STATES PATENT AND TRADEMARK OFFICE
CERTIFICATE OF CORRECTION

| | |
|---|---|
| PATENT NO. | : 6,246,457 B1 |
| DATED | : June 12, 2001 |
| INVENTOR(S) | : Masakazu Kobayashi |

It is certified that error appears in the above-identified patent and that said Letters Patent is hereby corrected as shown below:

<u>Claim 3,</u>
Line 7, delete "colors" and substitute -- color -- in its place.

Signed and Sealed this

Fifth Day of March, 2002

*Attest:*

*Attesting Officer*

JAMES E. ROGAN
*Director of the United States Patent and Trademark Office*